(12) United States Patent
Gusack

(10) Patent No.: US 8,170,698 B1
(45) Date of Patent: May 1, 2012

(54) VIRTUAL ROBOTIC CONTROLLER SYSTEM WITH SPECIAL APPLICATION TO ROBOTIC MICROSCOPY STRUCTURE AND METHODOLOGY

(76) Inventor: Mark David Gusack, Huntington, WV (US)

( * ) Notice: Subject to any disclaimer, the term of this patent is extended or adjusted under 35 U.S.C. 154(b) by 550 days.

(21) Appl. No.: 12/378,639

(22) Filed: Feb. 18, 2009

Related U.S. Application Data

(60) Provisional application No. 61/066,402, filed on Feb. 20, 2008.

(51) Int. Cl.
G05B 19/18 (2006.01)
(52) U.S. Cl. .......................................... 700/59; 700/160
(58) Field of Classification Search ...................... 700/59
See application file for complete search history.

(56) References Cited

U.S. PATENT DOCUMENTS

| | | | |
|---|---|---|---|
| 5,511,148 A | 4/1996 | Wellner | |
| 5,841,542 A * | 11/1998 | Milana et al. | 356/635 |
| 5,936,613 A * | 8/1999 | Jaeger et al. | 345/172 |
| 5,958,676 A * | 9/1999 | Olivo | 435/5 |
| 6,061,177 A | 5/2000 | Fujimoto | |
| 6,149,506 A * | 11/2000 | Duescher | 451/59 |
| 6,396,941 B1 * | 5/2002 | Bacus et al. | 382/128 |
| 6,441,807 B1 | 8/2002 | Yamaguchi | |
| 6,540,473 B2 * | 4/2003 | Inokuchi et al. | 414/800 |
| 6,767,099 B2 * | 7/2004 | Perkins et al. | 353/10 |
| 7,386,365 B2 * | 6/2008 | Nixon | 700/245 |
| 7,395,181 B2 | 7/2008 | Foxlin | |
| 7,400,108 B2 * | 7/2008 | Minor et al. | 318/568.12 |
| 7,413,565 B2 * | 8/2008 | Wang et al. | 606/1 |
| 7,421,102 B2 * | 9/2008 | Wetzel et al. | 382/128 |
| 7,446,935 B2 | 11/2008 | Maenle et al. | |
| 7,456,377 B2 * | 11/2008 | Zeineh et al. | 250/201.3 |
| 7,458,977 B2 | 12/2008 | McGinley | |
| 7,463,761 B2 * | 12/2008 | Eichhorn et al. | 382/133 |
| 7,466,303 B2 * | 12/2008 | Yi et al. | 345/156 |
| 7,466,307 B2 * | 12/2008 | Trent et al. | 345/173 |
| 7,468,161 B2 * | 12/2008 | Reinhardt et al. | 422/63 |
| 7,468,836 B2 | 12/2008 | Maenle et al. | |
| 7,474,296 B2 | 1/2009 | Obermeyer et al. | |
| 7,477,236 B2 | 1/2009 | Ofek et al. | |
| 7,479,950 B2 | 1/2009 | Dehlin et al. | |
| 7,487,461 B2 | 2/2009 | Zhai et al. | |
| 7,489,303 B1 * | 2/2009 | Pryor | 345/173 |
| 7,492,116 B2 * | 2/2009 | Oleynikov et al. | 318/568.12 |

* cited by examiner

*Primary Examiner* — Albert Decady
*Assistant Examiner* — Anthony Whittington

(57) ABSTRACT

The present invention defines a unique, flexible system that may be applied to the manufacture and assembly of a plurality of highly configurable and reusable virtual robotic control devices. It is specifically concerned with providing a plurality of self contained virtual control systems that comprise a moving part that is detected by an associated sensor whereby signals may be generated and transmitted to a plurality of other devices to operate a plurality of robotic microscopes directly or, when configured through a robot control program, through an intermediate computer and network. Furthermore, these virtual robotic control systems may be assembled into a number of partial or complete robotic microscopes so that the degree of realism and control over the examination of a slide may be matched more exactly to the needs and requirements of a microscopist.

5 Claims, 10 Drawing Sheets

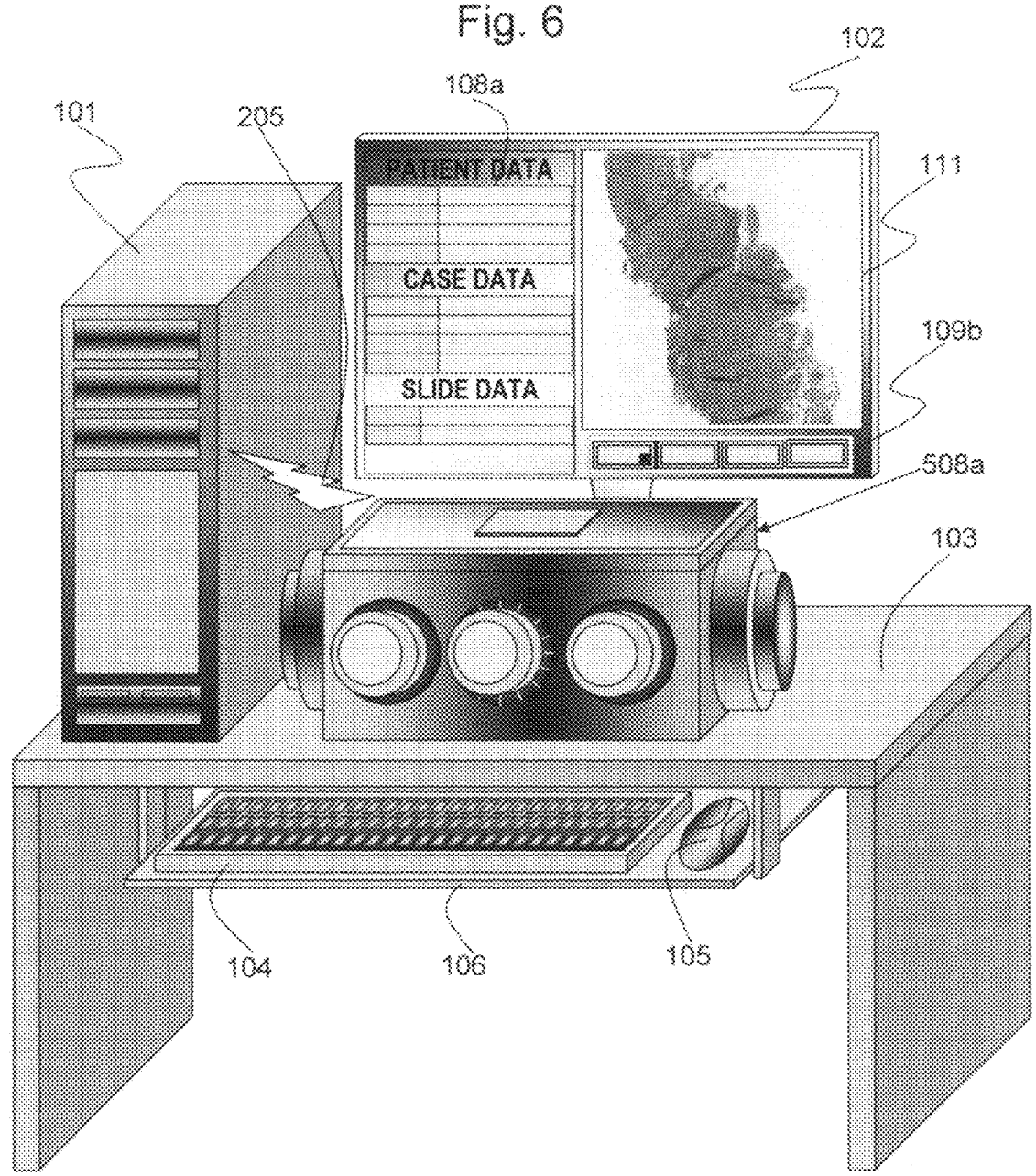

VIRTUAL ROBOTIC CONTROLLER SYSTEM WITH SPECIAL APPLICATION TO ROBOTIC MICROSCOPY STRUCTURE AND METHODOLOGY

CROSS-REFERENCE TO RELATED APPLICATIONS

This application claims the benefit of provisional patent application Ser. No. 61/066,402, filed 2008 Feb. 20 by the present inventor.

FEDERALLY SPONSORED RESEARCH

Not Applicable

SEQUENCE LISTING OR PROGRAM

Not Applicable

BACKGROUND

1. Field of Invention

This invention relates to a unique structure and methodology that creates a virtual robotic control system with special application to provide a more effective and natural means for a person to operate one or more stand alone or networked optico-mechanical robotic microscopes.

2. Description of Prior Art

Around 1674 Leeuwenhoek first examined microorganisms in a drop of water. This initiated the field of microscopy whereby a plurality of inert and biologic materials and objects with structures too small to be seen with the naked eye (herein below referred to as Microscopic Objects) could be routinely examined through the use of a magnifying device (herein below referred to as a Microscope) by a person or persons (herein referred to as Microscopist). Viewing Microscopic Objects under the Microscope generally requires that they be made thin enough to allow light to be transmit through them and to be fixed onto a carrier made of glass or other transparent material (herein below referred to as a Slide) and this is most often done by cutting one or a plurality of very thin sections from a larger object, adhering one or more sections to a Slide, staining them with a plurality of reagents, and optionally applying a transparent cover slip to enhance the visual appearance of structural components of the Microscopic Object so as to be more easily viewed by a Microscopist.

This viewing is achieved by placing a Slide on a flat surface known as a Microscope Stage positioned above a focusable light source and adjustable iris and beneath a plurality of magnifying lenses (herein each lens referred to as Objective), each objective providing a different magnification, through which light may be transmitted passing through an Objective rotated into the axis of the light thereby magnifying the Microscopic Object and displaying the resulting light image through a set of oculars manufactured from additional magnifying lenses, to the Microscopists' eyes. A single Microscopist controls the Microscope by moving a Slide across the Microscope Stage surface either by pushing and pulling it by hand or by fixing it in place with a clip and using two rotating controls attached to the Microscope one moving it in the x-axis and the other in the y-axis o the plane defined by the Microscope Stage. Simultaneously fine details of the Microscopic Object residing on the Slide are focused by the Microscopist rotating a pair of compound knobs known in the industry as course and fine focus controls located on both sides of the Microscope resulting in a change in the vertical distance between the Microscope Stage and Objective along the light axis. The act of viewing the Microscopic Object while moving the Slide, changing the Objectives, and focusing the Objectives (herein referred to as Examining) is a highly complex and exacting interaction of hand-eye coordination that determines the speed and thoroughness of the Examination.

Furthermore, Microscopes require that, to assure viewing of the exact same structures of Microscopic Objects residing on a Slide, all Microscopists must be present at the same location as the Slide. The need to have Microscopists located with the Slide to view it has lead to significant problems in reliably characterizing Microscopic Objects reducing both the efficacy and reliability of knowledge about them. Often the Slide or Slides to be examined must be sent physically to other Microscopists residing at another location. This leads to a number of problems including long delays in obtaining complete examination by a plurality of Microscopists, the prevention of real time interaction between each Microscopist who examines the Microscopic Objects, the potential for each Microscopist to view a different structure on a Slide, and the potential for loss of one or more Slides. These limitations and others have acted as a serious hindrance towards establishing and applying knowledge about Microscopic Objects. One of a plurality of specific examples; in the healthcare field, this limitation has adversely affected the development of reliable diagnostic criteria in hematological, surgical, and cytological pathology and prevented their accurate and precise application by pathologists and technologists to human tissues examined under a Microscope.

To solve this problem, the field of Telepathology has been developed by a number of companies including but not limited to Apollo, Aperio, Nikon, and Zeiss. Many of the above said companies implement Telepathology Systems by employing a computer system over a networks, the internet and virtual private networks (herein referred to as Network) controlling a plurality of modified Microscopes. Modified Microscopes (herein referred to as Robotic Microscope) are manufactured with a motorized Microscope Stage (herein referred to as Robotic Stage) that allows the Slide to be attached and moved by another device and set of individual Objectives of different magnification assembled to a motorized housing (herein referred to as Robotic Objectives) that allows each to be moved in turn into the axis of the Microscope sub stage light and moved vertically with respect to the Robotic Stage by another motorized device allowing a plurality of Microscopists to move the Slide, change magnification of and maintain focus on a Microscopic Object residing on a Slide while viewing digital images of part or all of the Microscopic Object on a video display device. This is accomplished through the issuance and receipt (herein referred to as Transmission) of a continuous stream of image and control information (herein referred to as Signals) to and from the above Robotic Microscope and one or more software applications (here in referred to as Robot Control Program) residing on a computer the Robot Control Program running on an operating system (herein referred to as Computer Interface) such as Microsoft Windows connected to one or more Robotic Microscopes by a plurality of means including but not limited to insulated conducting materials, and wireless systems (herein referred to as Connected or Connection). Prior art Telepathology Systems thereby meets the need to have a plurality of Microscopists residing at different locations examine a Slide or Slides simultaneously and avoids having to send Slides physically to each Microscopist in turn thereby also assuring that each is examining the exact same Microscopic Object and the exact same structures making up the Microscopic Object and communicating and discussing their observations through a telephonic system with other Microscopists also Examining the Slide.

Alternately, a solution offered by some of the above said companies such as Nikon involves making one or a plurality of digital scans of an entire Slide and storing the resulting image data in one or a plurality of files for storage, retrieval, Transmission, and Examination. This solution dispenses with the need for using the physical Slide and Robotic Microscope and relies solely on the use of a Robotic Control Program operated through a Computer Interface to act as if the Microscopist is viewing a Slide through a Robotic Microscope. Therefore, for the purpose of clarity, the files containing digital scans of an entire Slide are herein also referred to as Robotic Microscope as well with the understanding that the manipulation of the images residing in these files is carried out virtually and does not imply the use of a physical Robotic Microscope to Examine a physical Slide.

As presently designed and manufactured, both of the above said prior art Telepathology Systems force the Microscopist use a Computer Interface that hinders their ability to Examine a Slide with the same facility and efficiency as they would using a Microscope to Examine a Slide directly requiring that a virtual robotic control system be invented to solve the resulting problems.

A review of prior art virtual robotic controls is rich and extensive with tens of thousands of references and patents in a wide range of fields including but not limited to the following major contributions that bare on this invention: Drones (unpiloted planes) can be operated by a person located a great distance from the plane using a combination of virtual robotic control devices and computer interface. However, unlike the present invention, the person does not sit in a virtual plane and have both the option of flying a drone or flying the virtual plane to the same effect. The same is true in the flight simulation field where the pilot in training is surrounded by a realistic cockpit equipped with numerous virtual robotic controls that effect pitch and yaw while simulating altitude and other flight conditions while video display devices simulate the windows of the aircraft. Yet, again, this prior art does not address the concepts put forward by the present invention since the flight simulation cockpit does not control another real plane in real time nor does is it also capable of flying as well. In the field of radioactive materials and highly infectious organisms robotic handling devices have been employed for many years sometimes utilizing video display devices in association with virtual mechanical hand devices. Unlike the present invention, these devices serve a limited purpose of protecting the user from exposure to highly lethal materials and do not enhance the results of their work or allow a similar device residing at another location to be controlled in real time as the present invention does. Another important area is the use of virtual devices in computer gaming; for example Wii games that provide virtual robotic control devices for the user. However, these are used solely to control graphical images on a video display device for the purpose of play or training and do not lead to the control of another real device for the purpose of carrying out a task. Apple's IPod's revolutionary touch pad capabilities allow the user to grasp virtual images on a video display device and so a set of virtual microscope robotic control devices could be recapitulated on screen. Unfortunately, the IPod requires moving or turning something on a screen, which is flat and so requires the user look at the screen because there are no three dimensional tactile signals that allow the user to know where or how much they have actually moved a control. So, for example this is also the major problem with such prior art as Hidehiko Yamaguchi's Display System (U.S. Pat. No. 6,441,807 B1).

The closest that any virtual robotic control system comes to this invention is found in advanced surgery where a surgeon can manipulate a set of medical instruments through a combination of computer interface that magnify living tissues and virtual robotic control devices that carry out surgery or microsurgery. Oleynikov et al.'s Robot for Surgical Applications (U.S. Pat. No. 7,492,116 B2) is just one of many examples. However this prior art does not allow a plurality of persons residing at different locations to simultaneously participate in the surgery. Another example is Yulun Wang's Minimally Invasive Surgical Training using Robotics and Telecollarboration (U.S. Pat. No. 7,413,565 B2) which comes closer but focus' on providing an experienced surgeon with a means of guiding and overriding a resident in training like the controls in a driver's ed type car. Others like Shawn E. McGinley's Surgical Navigation Instrument useful in Marking Anatomical Structures (U.S. Pat. No. 7,458,997 B2) is focused on enhancing the surgeon's ability to align a prosthetic device for insertion into a femur. Tom Nixon's Tool Grip Calibration for Robotic Surgery (U.S. Patent (U.S. Pat. No. 7,386,365 B2) confines itself to very technical matters related to calibrating jaw forces for surgical and telesurgical systems. Robotic devices sold by Intouch Health do allow a limited means of caring for patients and manipulating objects by an operator residing at another location. However, presently, this is achieved through manipulation of a video display device, keyboard and mouse. None of the above prior art references examination of fixed tissues residing on a glass slide at a distance using a set of virtual robotic controls that recapitulate an actual microscope. Nor does each of the above said prior art provide the unique configurability and flexibility combined with replication of nature movements of the Microscopist in Examining a Slide.

More specifically, one key prior art James W. Bacus' Method and Apparatus for Internet, Intranet, and Local Viewing of Virtual Microscope Slides (U.S. Pat. No. 6,396,941 B1) specifically requires the use of a Keyboard and Mouse and does not cover the concept of a set of virtual robotic controls. Leading companies such as Zeiss have concentrated on the technical aspects of providing high resolution slide images. For example Jack A. Zeineh's System and Method for Creating Magnified Images of a Microscope Slide (U.S. Pat. No. 7,456,377 B2) is an attempt to solve the problem of focusing through a high magnification digital image of a whole Slide as one would do with an actual Slide on a Microscope. Maenle et al. Cytologic Imaging Systems and Methods (U.S. Pat. No. 7,445,935 B2) focus' attention on the technical aspects of holding slides for automated imaging not for robotic systems allowing a Microscopist to Examine them directly. Wetzel et al. System and Method for Finding Regions of Interest for Microscopic Digital Montage Imaging (U.S. Pat. No. 7,421,102) are concerned with artificial intelligence analysis of Microscopic Objects residing on Slides and attempting to locate for further Examination what might be the most important areas; again completely by-passing the critical needs of the Microscopist in having an effective system and methodology for controlling that slide. On a technical level, there is much prior art touching on this invention. However, in each case the actual specifications and claims are for areas not central to this patent. For example Jaeger et al. Rotary Circuit Control Devices with Changeable Graphics (U.S. Pat. No. 5,936,613) introduces the concept of changeable calibration marks on a control device but, unlike the one presented in this invention, does not pertain to the specific Robotic Objective magnification set on a specific Robotic Microscope residing at another location.

what is not encompassed by prior art is the use of a set of virtual robotic control devices that not only allow the execution, in real time, of a set of complex tasks on a plurality of robotic devices residing at a plurality of locations but to allow for the replacement of the very device it is designed to control for use locally, to allow for a plurality of Microscopists to engage in the tasks allowed by prior art Telepathology Systems using highly efficient and effective methods of manipulating the Slide while maintaining appropriate magnification and focus, to allow for a plurality of configurations to suite each Microscopist, and to allow for integration into prior art Telepathology Systems, to name a nonexclusive set of unique improvements.

Specifically, prior art Telepathology Systems impose on the Microscopist unnatural movements in the form of numerous Keyboard strokes, Mouse moves, and Mouse clicks to cause a Slide attached to a Robotic Stage to move thereby limiting the speed, flexibility, thoroughness, and scope of Examination that could be achieved through the use of a Microscope.

Furthermore, prior art Telepathology Systems impose on the Microscopist unnatural movements in the form of numerous Keyboard strokes, Mouse moves, and Mouse clicks to change Robotic Objectives thereby limiting the speed, flexibility, thoroughness, and scope of Examination that could be achieved through the use of a Microscope.

Furthermore, prior art Telepathology Systems impose on the Microscopist unnatural movements in the form of numerous Keyboard strokes, Mouse moves, and Mouse clicks to maintain the Microscopic Object residing on the Slide in fine focus as Microscopist causes a Robotic Stage to move a Slide under a Robotic Objective thereby limiting the speed, flexibility, thoroughness, and scope of Examination that could be achieved through the use of a Microscope.

Furthermore, prior art Telepathology Systems prevents the Microscopist from causing a Robotic Stage to move a Slide while simultaneously maintaining the Microscopic Object residing on the Slide in fine focus causing additional limits to the speed, flexibility, thoroughness, and scope of Examination that could be achieved through the use of a Microscope.

Furthermore, prior art Telepathology Systems impose a design limitation that prevent free hand movement of a Slide, a method most favored by most Microscopists causing additional limits to the speed, flexibility, thoroughness, and scope of Examination that could be achieved through the use of a Microscope.

Furthermore, prior art Telepathology Systems impose a methodology for focusing Robotic Objectives on a Slide that prevent continuous rapid fine up and down movements of the Robotic Objectives, a critical need of the Microscopist to maintain a Microscopic Object residing on the Slide in fine focus during movement of the Slide, as well as building a composite impression of the entire depth of the section thereby greatly hindering the speed, flexibility, thoroughness, and scope of Examination that could be achieved through the use of a Microscope.

For the foregoing reasons and many others to be revealed herein below, there is a need for an improved Virtual Robotic Control System (herein referred to as VRCS) that provides a structure and methodology to control the Slide movement, change of Robotic Objectives, and maintenance of fine focus of Microscopic Objects in a manner that very closely recapitulates that provided to a Microscopist using a Microscope yet still allowing all the benefits herein noted above extant in prior art Telepathology Systems.

SUMMARY OF ABBREVIATIONS

The following abbreviations more fully defined herein below are offered for the purpose of clarity in reading this patent:

| VSD | Virtual Slide Device |
| VRSD | Virtual Robotic Stage Device |
| VRCD | Virtual Rotating Control Device |
| VCD | Virtual Control Device - term encompassing the above said devices |
| VCB | Virtual Control Box |
| VRMB | Virtual Robotic Microscope Base |
| VRCS | Virtual Robotic Control System |

SUMMARY OF THE INVENTION

Accordingly, it is an object of this invention to provide a unique structure and methodology to design and manufacture a plurality of devices that allow a Microscopist to control a plurality of Robotic Microscopes either through a plurality of Connections to Robotic Microscopes, through a Connection to a plurality of computers (herein defined as any numeric computing device capable of running an operating system, a robotic control program and communicating with other devices directly or over a network), in turn, Connected to Robotic Microscopes, or through a plurality of networks Connected either to Robotic Microscopes or through computers such that a plurality of Microscopists are able to perform an Examination of one or a plurality of Slides by manipulation of a plurality of Virtual Control Devices so as to cause one or a plurality of Slides residing on a plurality of Robotic Microscopes to move and to allow the Microscopist to focus through the depth of the Microscopic Object residing on the Slide and use a plurality of Robotic Objectives as if they were Examining a Slide on a Microscope.

BRIEF DESCRIPTION OF DRAWINGS

Figures

Various other objects, features, and attendant advantages of the present invention will be more fully appreciated as the same becomes better understood when considered in conjunction with the accompanying drawings.

Reference Numerals and Lines

Figure 1A:
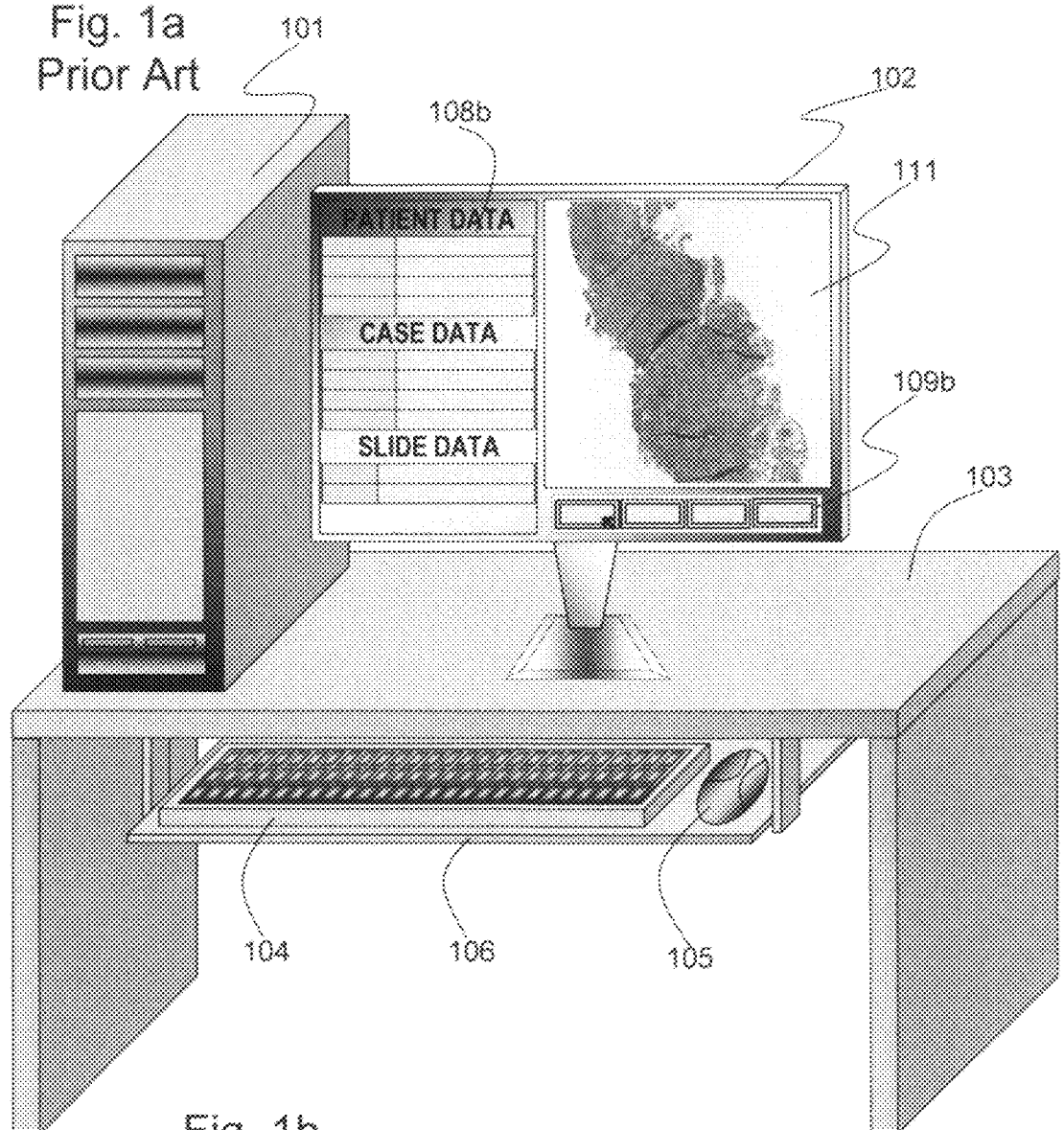

Each part herein is identified uniquely by Figure Number indicating the page where it is first revealed concatenated to two additional sequence numerals. In the drawings, closely related figures have the same number but different alphabetic suffixes to indicate that each is a subpart or modification of a part with the same or similar function. Lines with arrows indicate an assembled part referenced elsewhere in the specifications.

Figure 1B:
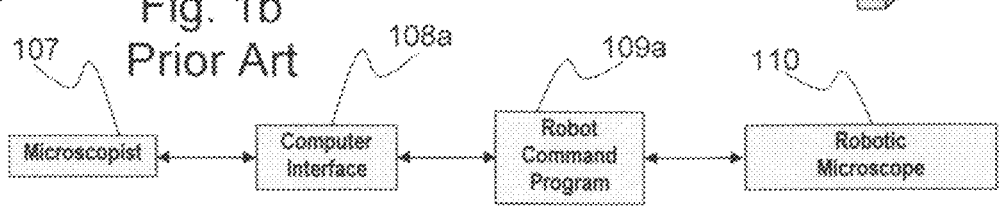

FIG. 1a to b is a three-dimensional view of prior art Telepathology System comprising a computer with Robotic Control Program and Computer Interface that is Connected to a Robotic Microscope (Robotic Microscope shown schematically for clarity) that allows a Microscopic Object residing on a Slide to be Examined by a plurality of Microscopists residing at other locations.

FIG. 2a to d are four three-dimensional views of a first embodiment of the invention revealing four implementations of a Virtual Slide Device that can be moved by a person's finger over one or the other of two implementations of a Virtual Robotic Stage Device that is manufactured to detect the Virtual Slide Device and to Communicate with a plurality of other devices as revealed herein below.

FIG. 3a to d are four three-dimensional views of a second embodiment of the invention revealing three implementations of a Virtual Rotating Control Device where by a plurality of these devices may be used in conjunction with the above said Virtual Slide Device and Virtual Robotic Stage Device revealed in FIG. 2 to create a more natural means of controlling a Robotic Microscope.

Figure 4:
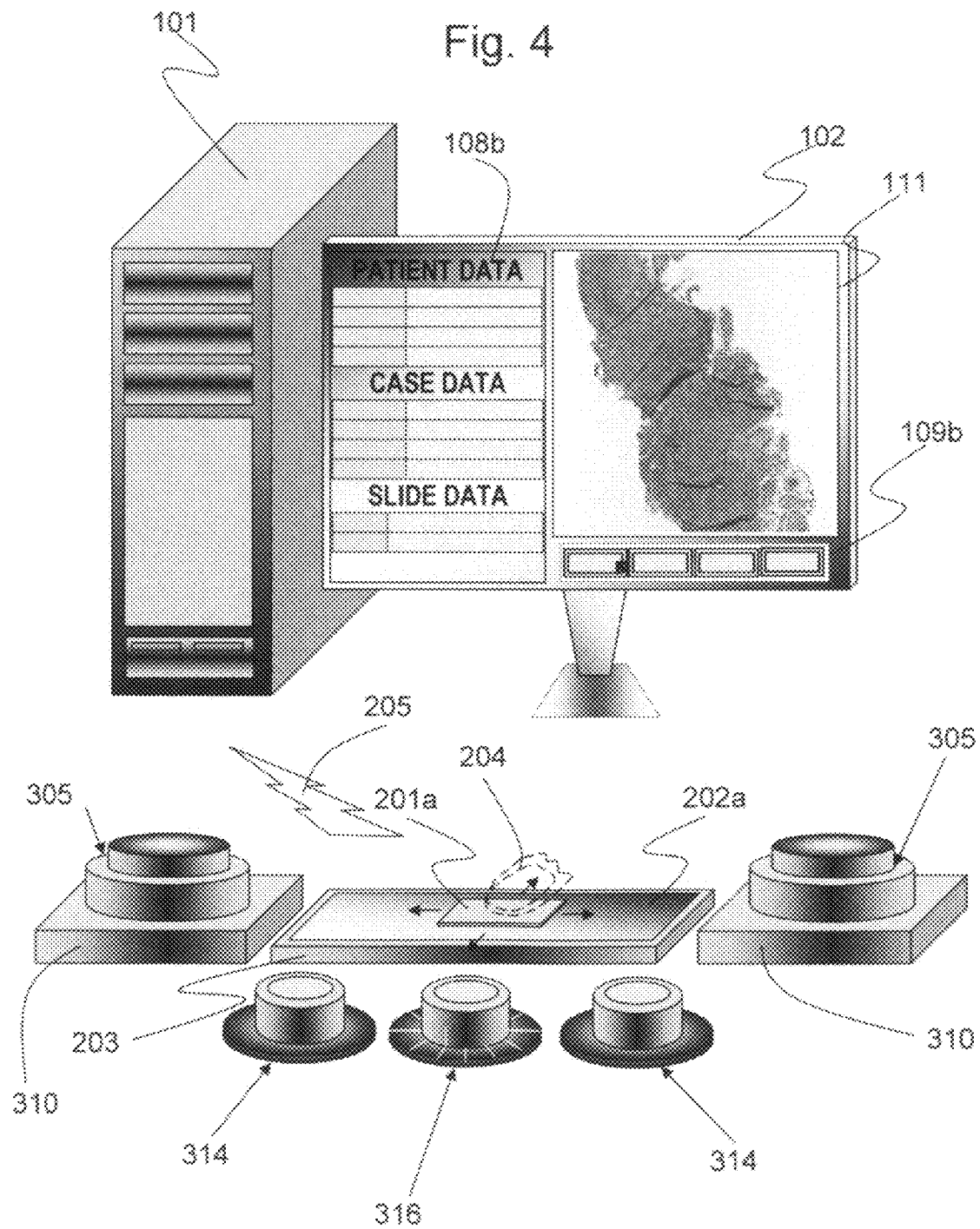

FIG. 4 is one three dimensional view of a third embodiment of the invention revealing a plurality of Virtual Control Devices revealed in FIGS. 2. and 3. above placed together on a flat surface and Connected to a computer with video display device such that they may Transmit Signals to and from a Robotic Microscope allowing for a Microscopist to Examine a Slide on a Robotic Microscope while viewing digital images of Microscopic Objects residing on a Slide.

Figure 5A:
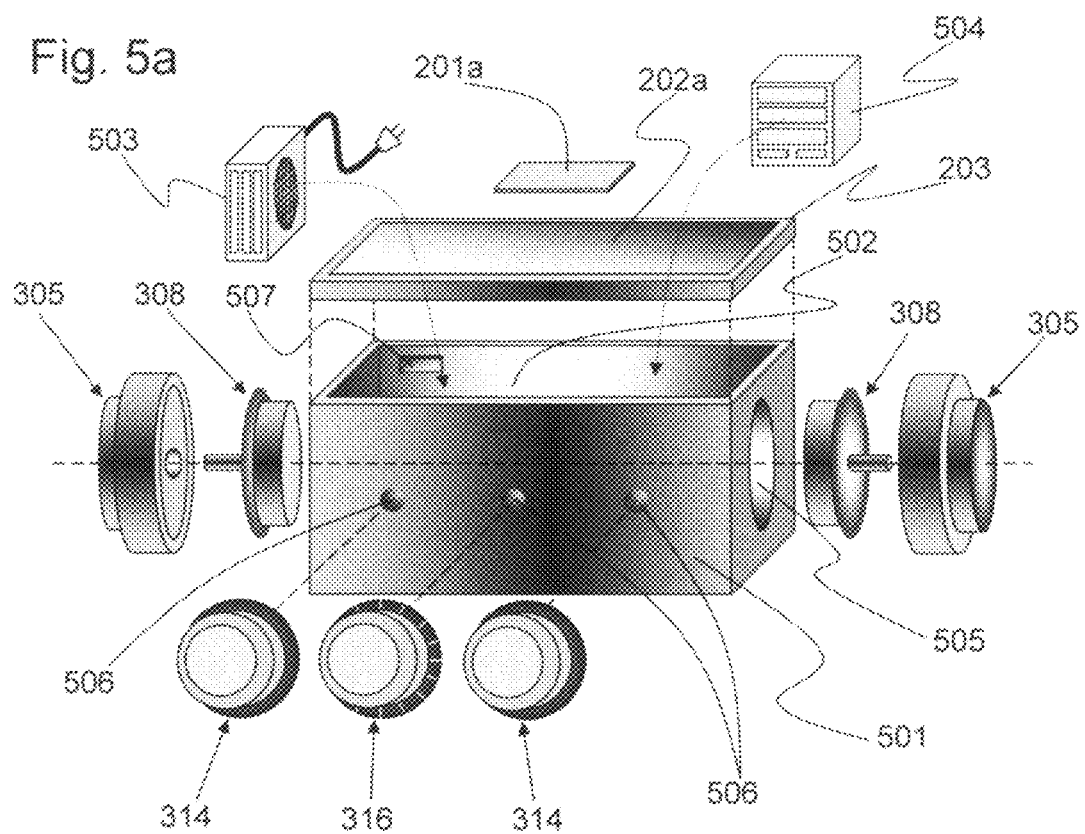
Figure 5B:
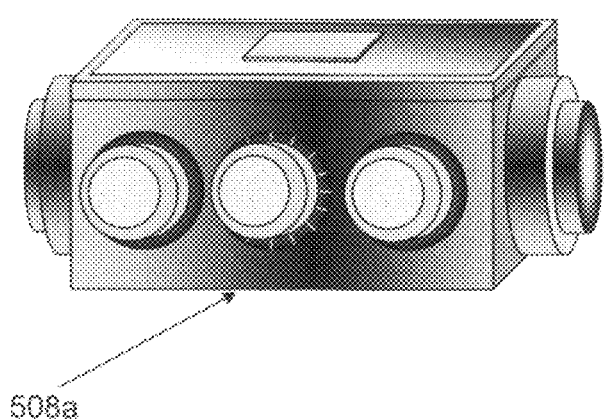

FIG. 5a to b are two three-dimensional views, one exploded and one assembled, of a fourth embodiment of the invention revealing a first implementation of a Virtual Control Box whereby a plurality of devices revealed in FIGS. 2. and 3. above may be assembled together on a customizable housing for the purpose of being incorporated into a plurality of other devices including a Virtual Robotic Microscope such that a plurality of highly flexible Telepathology Systems may be designed and manufactured.

FIG. 6 is one three-dimensional view of a fourth embodiment of the invention revealing a first implementation of a configurable Virtual Control Box incorporated into a Telepathology System consisting of one computer, one video display, one key board, and one Mouse thereby enhancing the usability of robotic systems through the integration.

Figure 7:
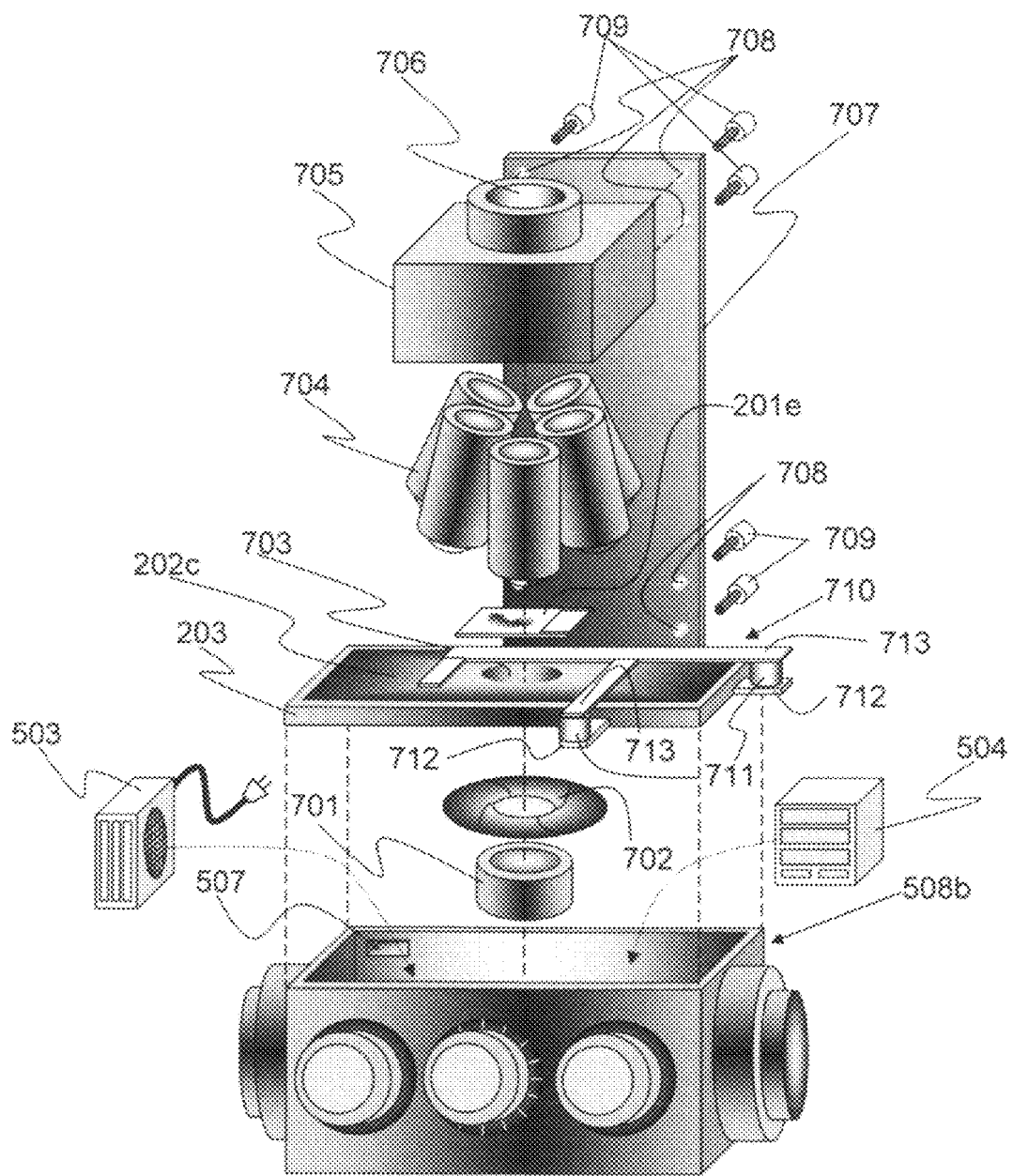

FIG. 7 is one three dimensional view, exploded, of a fifth embodiment of the invention revealing one second implementation of a Virtual Control Box replacing a Robotic Microscope base utilizing a plurality of additional commercially available analog and/or digital microscope parts assembled to provide a means of creating a plurality of Virtual Robotic Microscopes thereby greatly enhancing the flexibility and power of Telepathology Systems.

Figure 8:
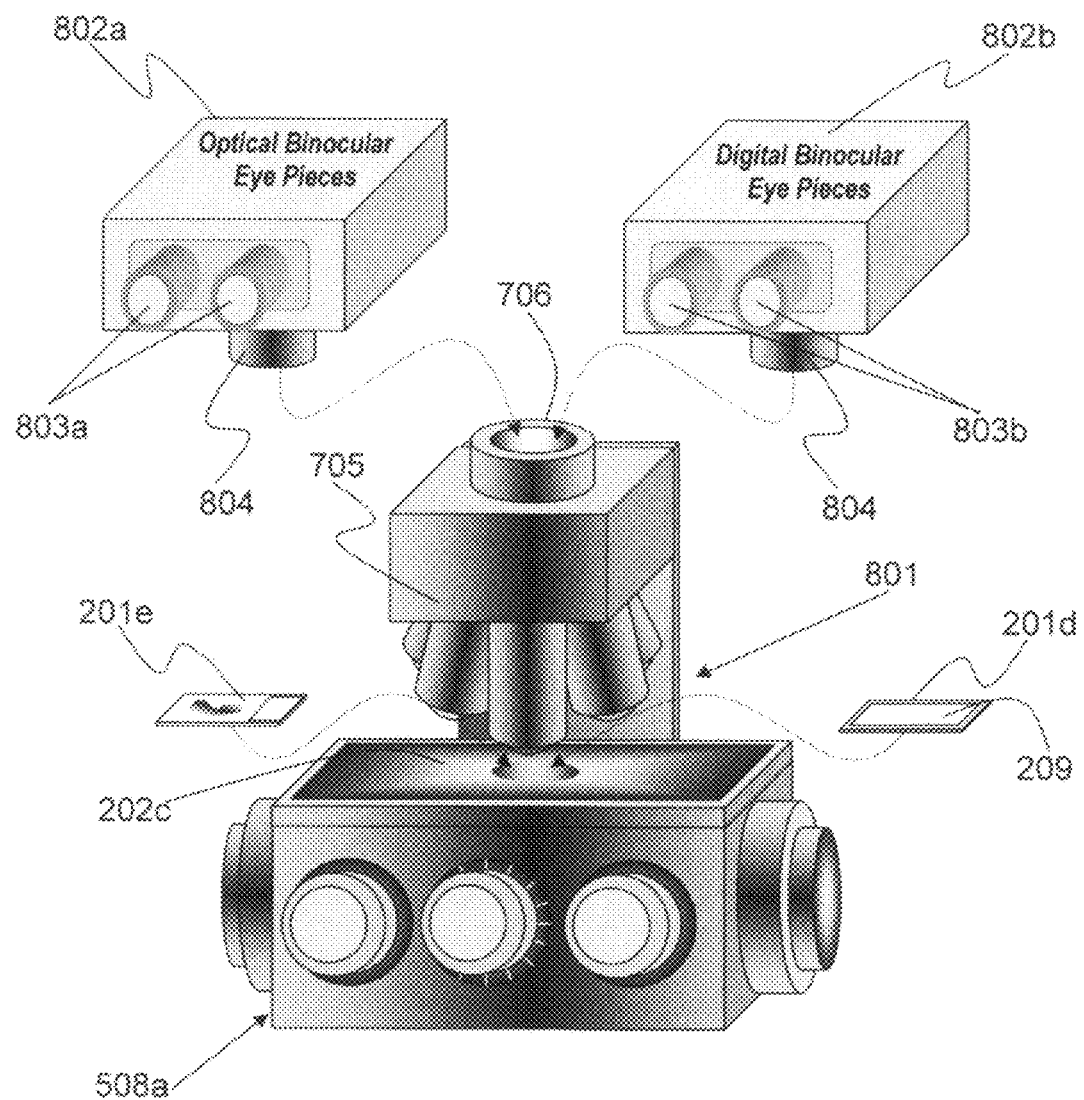

FIG. 8 is one three dimensional view, assembled, of a sixth embodiment of the invention revealing a second implementation of Virtual Control Box revealed in FIG. 7. above incorporated into a Virtual Robotic Microscope with either optical or digital binocular eye pieces such that the resulting device may be configured to act just like a Microscope but provide the additional capabilities required to be used effectively as part of a Telepathology System.

Figure 9:
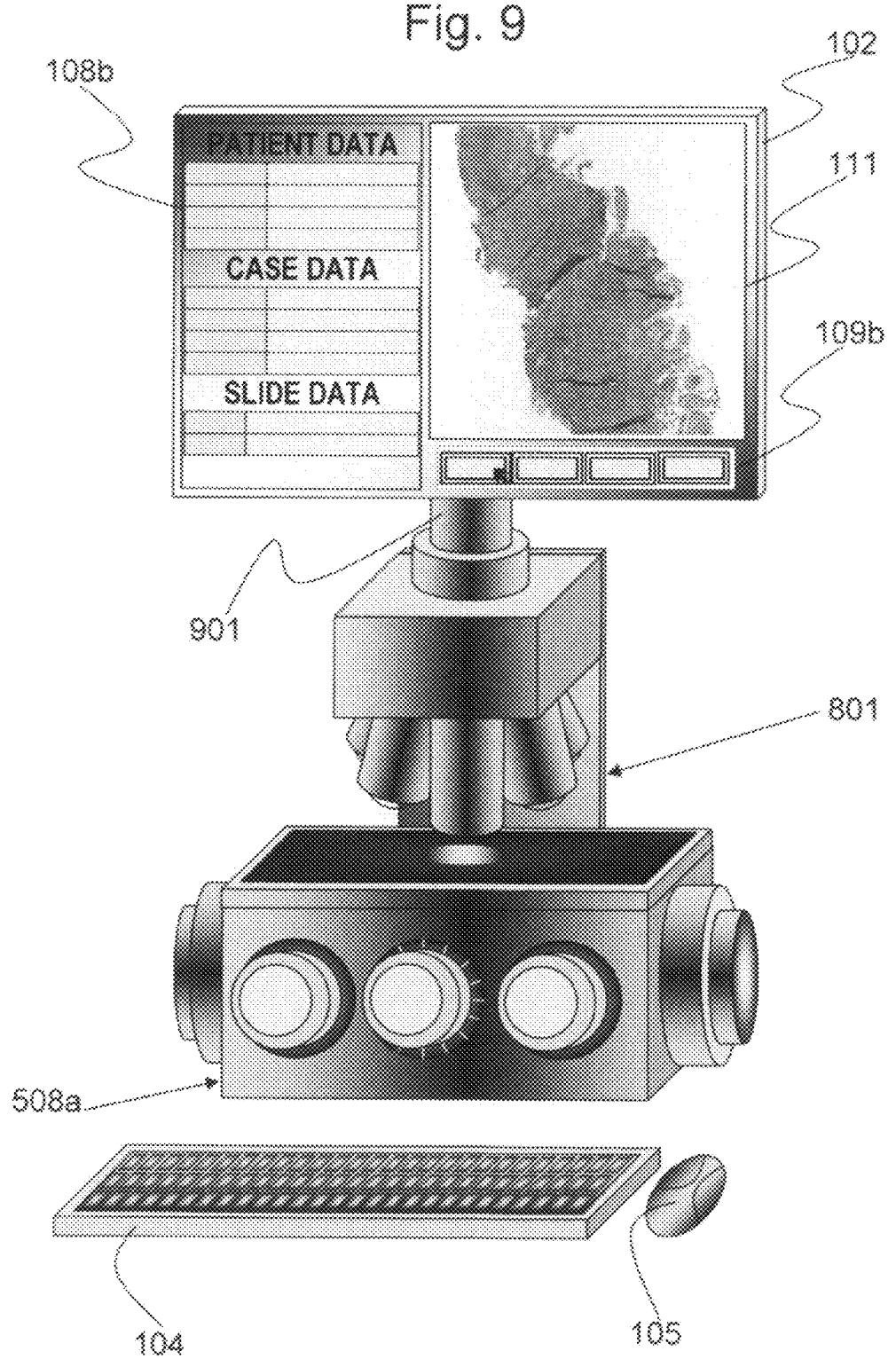

FIG. 9 is one three dimensional view, assembled, of a seventh embodiment of the invention revealing the second implementation of Virtual Control Box revealed in FIG. 7. above incorporated into the Virtual Robotic Microscope revealed in FIG. 8. above with video display device attached instead of the binocular viewing pieces revealed in FIG. 8 above resulting in additional capabilities as part of a Telepathology System.

Figure 10:
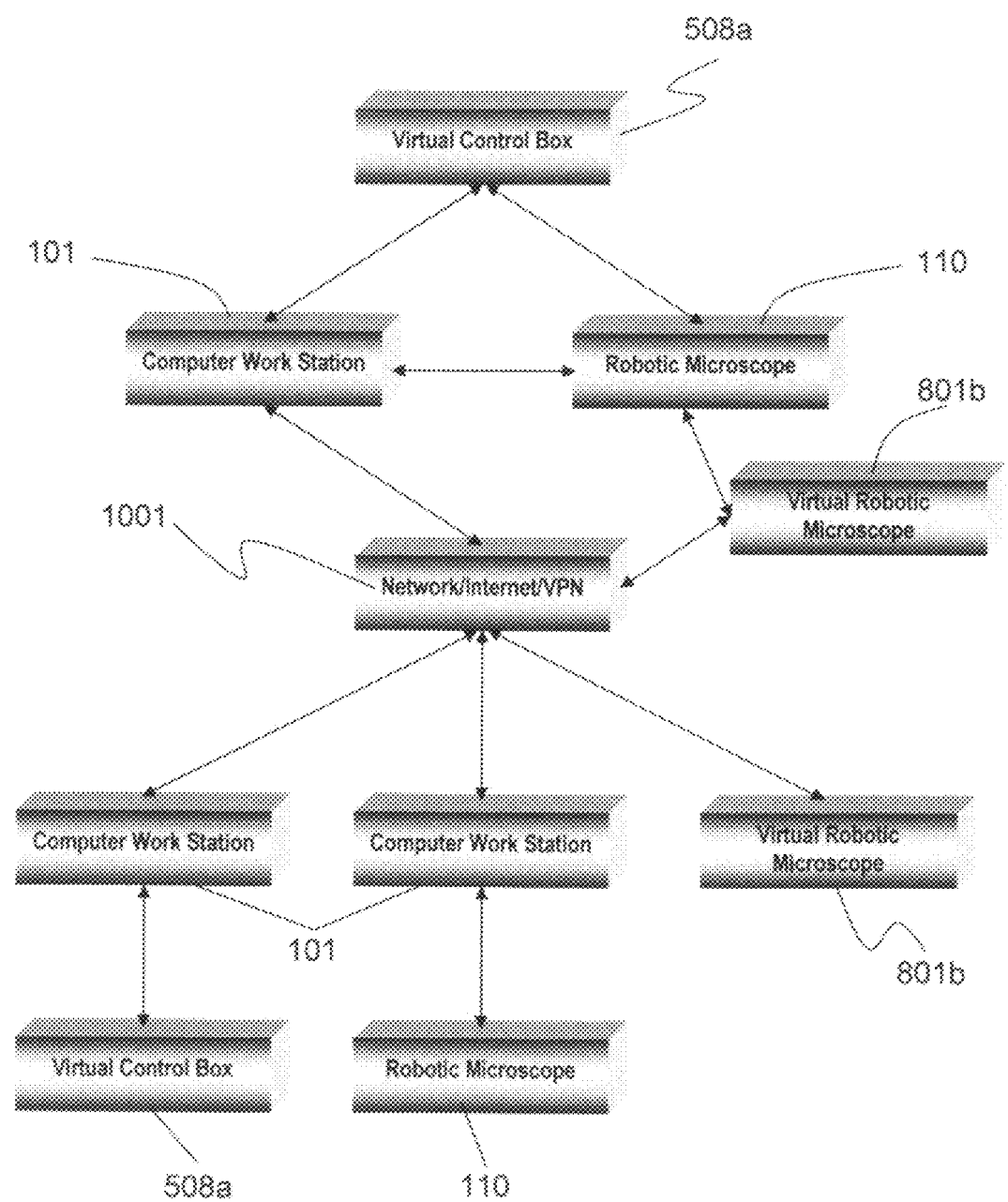

FIG. 10 is one schematic view revealing the implications of the invention whereby the above said embodiments of the invention may be Connected to and communicate with a plurality of other devices including but not limited to computers, Networks, other Virtual Robotic Microscopes, and commercially available Robotic Microscopes such that a plurality of Microscopists residing at different locations may simultaneously Examine a plurality of Slides as if they were using a Microscope thereby greatly enhancing the Telepathology System.

DETAILED DESCRIPTION OF THE PREFERRED EMBODIMENT

The significance of the present invention is best understood by presenting an example of the prior art that the present invention proposes to replace.

Standard Telepathology System—Prior Art: FIG. 1

Shown in FIG. 1a is a three-dimensional view of a prior art Telepathology System comprising a computer (101) and a video monitor (102) usually placed on a surface; in this case a desk (103) with a Keyboard input device (104) (herein referred to as Keyboard) and pointing device (105) (herein referred to as Mouse) usually placed on a sliding platform under the desk (106) as well as a means of Transmitting Signals amongst these devices and a means to Transmit Signals from Robot Control Program (109a) shown as a schematic and as four buttons (109b) via Computer Interface (108a) shown as a schematic and as an example data listing (108b) on video display device (102) by a Connection between computer (101) and Robotic Microscope (110) (shown as a schematic only). The resulting prior art Telepathology System allows the Microscopist to Examine a plurality of Slides placed on a Robotic Stage and made visible on the video display device (102) while allowing Microscopist to control Slide by operating Keyboard and Mouse to issue Signals to the Robotic Control Program (109) through the Computer Interface (108a). Typically, controlling Slide movement requires the Microscopist to type a plurality of command keystrokes on the Keyboard (104) as well as move the Mouse (105) and either carrying out what is called in the industry "grab and drag" operations on an image of the Microscopic Object (111) visible on the video display device (102) or click on button objects also visible on the video display device (102). The resulting Signals Transmitted from the Robot Control Program to the Robotic Microscope causes a Slide fixed to the upper surface of the Robotic Stage to move under one of a plurality of Robotic Objectives, cause magnification to be changed by causing one of a plurality of Robotic Objectives incorporated in a motorized housing to move into the light axis, and to change focus by causing the Robotic Stage and Robotic Objective to move relative to each other along the light axis.

Shown in FIG. 1b is a schematic view of prior art Telepathology Systems structure. In this configuration the Microscopist (107) must interact with the Robot Control Program (109a) through a Computer Interface (108a) using a set of predefined software commands Transmitted to a Connected Robotic Microscope (110).

Limitation of said prior art is that the Microscopist is not able to move a Slide as efficiently and accurately as they could by manipulating a Slide directly by hand or by manual rotating controls commonly found on commercially available Microscopes. This is due to prior art Telepathology Systems requiring that the Slide be fixed in place on the Robotic Stage and controlled through a set of predefined Signals Transmitted to the Robotic Microscope from the computer (101) imposing tedious, unfamiliar, and time consuming manual tasks. The resulting unnatural hand motions imposed by prior art Telepathology Systems interfere with a comfortable and adequate Examination of a Slide and leads to rapid onset of frustration and exhaustion on the part of the Microscopist.

The above said limitation creates a plurality of serious problems with prior art Telepathology Systems including but not limited to the following:

1. It is extremely difficult for a Microscopist to make a full and accurate Examination of the contents of a Slide due to prior art Telepathology Systems interfering with the hand/eye coordination in moving Slide.
2. It is not possible for the Microscopist to rapidly change Robotic Objectives and resume Examination of the contents of Slide.

3. It is not possible to move the Slide and simultaneously adjust fine focus rapidly up and down through the depth of the Microscopic Object on Slide.
4. It is not possible to look through a set of binocular eye pieces to view the Slide due to prior art Telepathology Systems requiring that a digital image be displayed on a video screen.

In a plurality of embodiments of the present invention a unique VRCS is described which solves each of the above said problems while revealing numerous additional advantages over prior art.

One First Embodiment of a VRCS revealing a Virtual Slide Device and Virtual Microscope Stage Device: FIG. 2

Figure 2A:
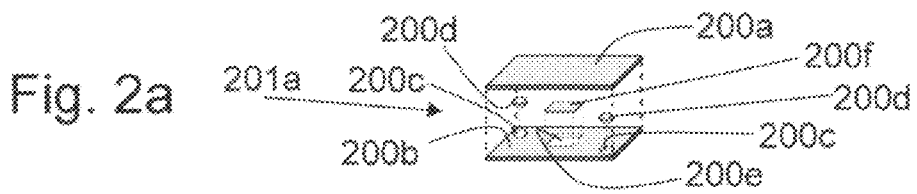

Shown in FIG. 2a is a three-dimensional exploded view of one first implementation of an embodiment of the present invention consisting of a first panel (200a) and a second panel (200b) manufactured of a rigid material including but not limited to organic and semi conducting materials, plastics, and metals (herein referred to as Rigid Materials) that snap together, with two slots (200c) situated at two opposite corners of each panel (200a, 200b) (only those in 200b shown for clarity) into which may be inserted optional devices (200d) that are capable of generating an electromagnetic field when connected to a power source or are made of an inert material detectable by a sensor and an optional slot (200e) into which is inserted an optional power source (200f), in this implementation, a battery to generate an electromagnetic field if needed; the assembly constituting a Virtual Slide Device (201a) (herein referred to as VSD) with a size comparable to commercially available Slides. A third panel constituting the Virtual Robotic Stage Device (202a) (herein referred to as VRSD) manufactured from a Rigid Material with a size comparable to that of a Robotic Stage and incorporating any one or a plurality of commercially available sensor devices based on a plurality of technologies such as but not limited to radio frequency sensors, capacitive sensors, and pressure sensitive sensors, incorporated into digital tablets sold by companies like Adesso which are capable of detecting and processing electromagnetic signals from other devices or detecting the presence of inert materials moved across a surface such that when VSD (201a) is placed on and moved across the surface of the VRSD (202a) signals from the panels (200a, 200b) or from devices (200d) are detected by VRSD (202a) determining the presence, size (derived using the Pythagoras theorem the hypotenuse defined by the distance between the two devices (200d) squared equals the sum of the square of the short and long side of the VSD (201a)), position, and velocity (velocity having the classical meaning of a vector that defines scalar speed and direction of movement) of the VSD (201a) which are, in turn, Transmitted as Signals to a plurality of other devices. A person skilled in the art will know that commercially available sensor devices are presently capable of detecting and Transmitting Signals at rates as fast as or faster than what would necessary to convey enough information to other devices such that the receiving device could respond to most of the motions of a Microscopist's movement of VSD (202a) virtually simultaneously. The VRSD (202a) is, in turn housed in a frame (203) manufactured from a Rigid Material allowing it to be placed on a flat surface and assembled to a plurality of other devices including but not limited to a source of power (not shown for clarity).

Figure 2B:
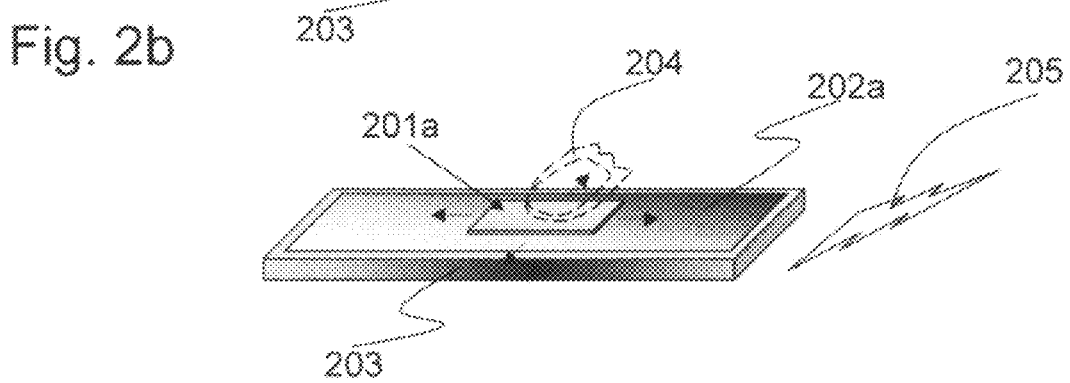

Shown in FIG. 2b is a three-dimensional assembled view of a first implementation of an embodiment of the present invention consisting of the VSD (201a) lying on the VRSD (202a) housed in a frame (203) whereby the VSD (201a) is shown being moved across the surface of the VRSD (202a) by a Microscopist's finger (204) thereby causing the VRSD (202a) to detect and Transmit Signals (205) (shown symbolically as a lightening bolt) containing at least the position, and velocity of the VSD (201a) to a plurality of other devices including but not limited to a computer (101) or Robotic Microscope (110).

Figure 2C:
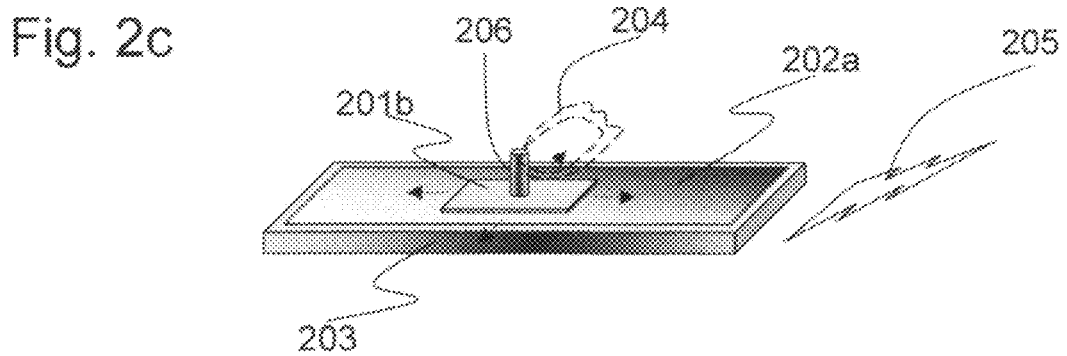

Shown in FIG. 2c is a three-dimensional assembled view of a second implementation of the first embodiment of the present invention consisting of a modification of the VSD (201b) by the addition of a vertical piece (206) manufactured from a Rigid Material attached to one surface of the VSD (201a) whereby the Microscopist may grasp or push on the vertical knob (206) to move the VSD (201b) across the surface of a VRSD (202a).

Figure 2D:
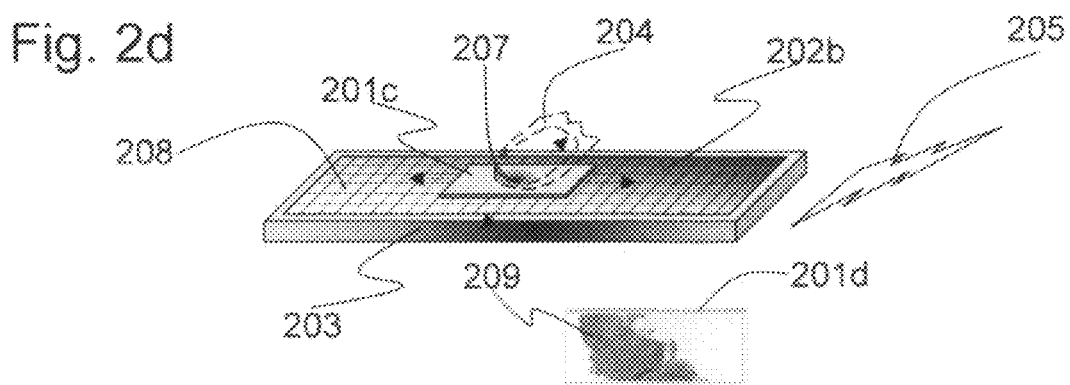

Shown in FIG. 2d is a three-dimensional assembled view of a third implementation of the first embodiment of the present invention consisting of a modified VSD (201c) now with the addition of a small depression (207) on its surface and a modification of the VRSD (202b) by the addition of a rectilinear sensor grid (208) incorporated into its exposed surface such that very rapid or discontinuous movements of the VSD (201c) by a Microscopist that might not be detected by the VRSD (202a) may be detected by the rectilinear sensor grid (208) incorporated into modified VRSD (202b) and these additional Signals Transmitted by VRSD (202b) to a plurality of other devices.

Furthermore, shown is an orthogonal view of a fourth implementation of the first embodiment of the invention whereby a modified VSD (201d) is now manufactured with a built in video display device (209) that is powered by optional power source (200f) allows an image to be Transmitted to it from a plurality of other devices; in this case an image of a Slide on a Robotic Microscope residing at another location. A person skilled in the art will see that additional information pertaining to Slides such as but not limited to slide and patient identification stored on a device residing at an another location may be displayed with the image of the Slide recapitulating what the Examining Microscopist would see if they were handling the Slide directly.

One second Embodiment of a VRCS revealing a plurality of Virtual Rotating Control Devices: FIG. 3.

Figure 3A:
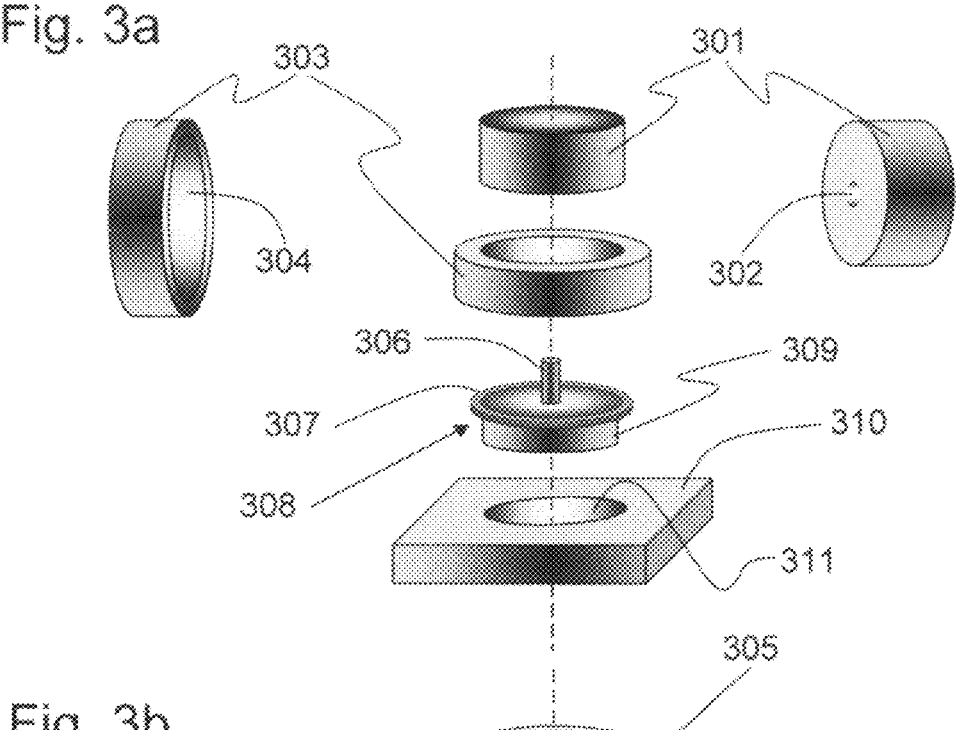

Shown in FIG. 3a is a three-dimensional exploded view of a first implementation of a second embodiment of the present invention consisting of one first knob (301) manufactured from a Rigid Material with centrally located slot (302) and one second knob (303) manufactured from a rigid material with centrally located slot (304) such that the first said knob (301) may be placed into the slot (304) of the second knob (302) creating a compound knob whereby each knob (301, 303) may be rotated independently from each other. Furthermore, shown is one first knob actuator spindle (306) manufactured from a rigid material and incorporating a device that detects the rotation of first knob (301) when placed in contact by positioning the first slot (302) over the first knob actuator spindle (306) and one second knob actuator ring (307) manufactured from a rigid material incorporating a device that detects the rotation of second knob (303) when placed in contact with said second knob actuator ring (307) the actuators together comprising a compound actuator assembly (308) that may be further assembled to a connector (309). A person skilled in the art will know that this assembly of parts may be secured together by use of screws or other means (herein referred to as Fasteners). Furthermore a person skilled in the art will see that, when manufactured from any of a plurality of commercially available actuator devices, the turning of either or both the knobs (301, 303) will cause actuators each is respectively in contact with (302, 304) to Transmit Signals indicating the degree of rotation of the respective knob in contact with it to a plurality of other devices. When all four devices (301, 302, 303, and 304) are assembled they comprise a Virtual Rotating Control Device (305) (herein referred to as VRCD) this particular implementation consisting of two separately rotating knobs that may be attached to a housing manufactured from a Rigid Material (310) with slot (311) manufactured to fit connector (309) and, if needed, with additional Fasteners (not shown for clarity) manufactured to secure the assembly.

Figure 3B:
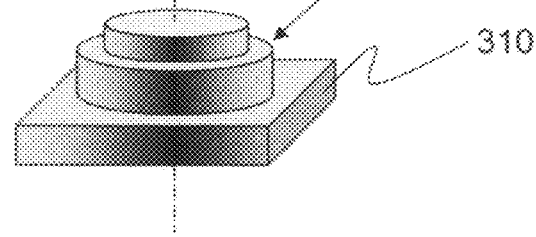

Shown in FIG. 3b is a three-dimensional assembled view of the VRCD (305) revealed in FIG. 3a above assembled to housing (310) into which may be incorporated a plurality of additional devices including but not limited to a source of power then entire assembly placed on any flat surface at the convenience of a Microscopist.

Figure 3C:
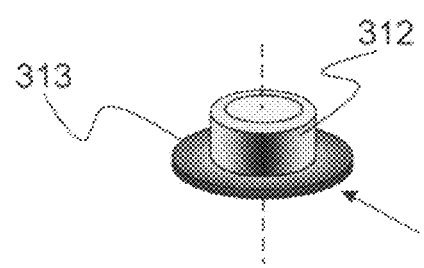

Shown in FIG. 3c is a three-dimensional assembled view of a second implementation of the second embodiment of the present invention whereby a single knob (312) is assembled to another actuator (313) (not shown in this view) that acts as its own housing to create a single VRCD (314) that can be attached to other objects as revealed herein below or placed on any flat surface at the convenience of a Microscopist.

Figure 3D:
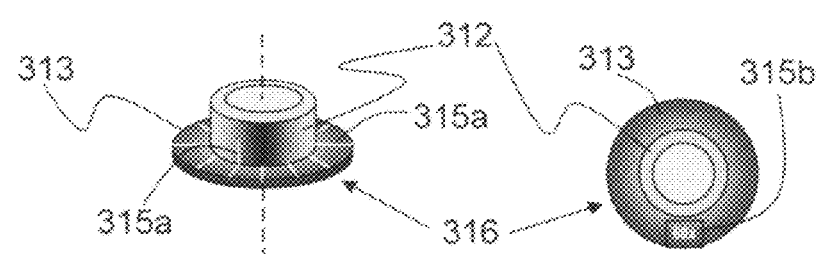

Shown in FIG. 3d is a three-dimensional assembled view of a third implementation of the second embodiment of the present invention whereby the VRCD (314) revealed above in FIG. 3c. is modified by adding at least one first marking (315a) on the surface of knob (312) and a plurality of additional markings (315a) placed on the surface of the actuator base (313) such that the progress of movement of knob (312) around the actuator base (313) can be visualized by the Microscopist. Furthermore, a person skilled in the art will see that the VRCD (316) may be manufactured such that graphical and alphanumeric symbolic markings may be added (not shown for clarity) indicating Objective magnification or at least one video display device (315b) may be assembled to the VRCD (316) to display graphical and alphanumeric symbols Transmitted from another device and also that VRCD (316) may be manufactured with a resistance stop incorporated into the actuator such that the knob (312) will turn a fixed distance with each twist allowing for discrete predefined rotational Signals to be Transmitted to a plurality of devices.

One third Embodiment of a VRCS incorporating a plurality of a free standing devices revealed herein above in FIGS. 2 and 3 into a first implementation of an improved Telepathology System: FIG. 4

Shown in FIG. 4 is a three-dimensional view of a third embodiment of the invention consisting of five VRCD's (two of 305 each on base (310), two of 314, and one of 316) grouped with a pairing of VSD (201a) and VRSD (202a) with housing (203) to comprise a first VRCS. In this implementation each VRCD may be arranged on a flat surface (not shown for clarity) according to the Microscopist's needs in front of a computer (101) and video display device (102) where each device (201a, 202a, two of 305, two of 314, and 316) is manufactured and configured to Transmit Signals to the Robotic Control Program (109a) running on computer (101) which, in turn, Transmits Signals to a Robotic Microscope (110) (not shown for clarity) to control its various parts. Each revealed device (201a, 202a, two of 305 on base (310), two of 314, and 316) comprises a first set of Virtual Control Devices (herein referred to singly and together as VCD's).

A person skilled in the art will see that each individual VCD may be powered separately or together using a plurality of sources including but not limited to a rectifier and insulated conducting material that can be Connected to an alternating current source, a Connection to the computer (101) such as through a Universal Serial Bus (herein referred to as USB), and by a plurality of commercially available batteries, (the entirety of the above possible power sources referred to herein as Power Source).

Furthermore, a person skilled in the art will know that each VCD may be assigned a unique identifier through commercially available means such as but not limited to radio frequency devices also known as RFD's commonly used to keep track of inventories in most large commercial businesses, and that each VCD may be configured such that when each VCD is manipulated by the Microscopist each VCD Transmits Signals (205) (for clarity only one representation symbolically as a lightening bolt shown to represent all Transmissions) to a plurality of other devices that identify which VCD is Transmitting and how the receiving device or devices should respond to the Signals; in this specific implementation, a computer (101). Furthermore, a person skilled in the art will know that commercially available Robot Control Programs (109a) residing on computer (101) in prior art Telepathology Systems may be modified or augmented by additional software applications that cause the Signals Transmitted (205) from VCD's to be interpreted by Robot Control Programs (109a) as if initiated by a Keyboard and Mouse and that issues Signals to a plurality of other devices; in this case a Robotic Microscope (110) causing it to respond in a manner that allows the Microscopist to Examine a Slide as they would if they were controlling a Robotic Microscope more directly than through a prior art Telepathology System.

More specifically, in this implementation the VSD (201a) and VRSD (202a) are configured to allow the Microscopist to cause the Robotic Stage to move a Slide residing on the Robotic Microscope (110) at a comparable speed, direction, and distance as they would if they were moving the Slide itself on a Microscope. The single VRCD's without markings (314) are configured such that when rotated by Microscopist they cause a Robotic Stage to move a Slide just like a traditional sub stage knobs available on Microscopes. The two compound VRCD's (305) are configured such that when the knob (303) is rotated by Microscopist the Robotic Microscope adjusts course focus and when knob (301) is rotated by Microscopist the Robotic Microscope adjusts fine focus on Microscopic Object as if they were being focused by a Microscopist Examining a Slide on a Microscope. The single VRCD with markings (316) is configured to allow the Microscopist to choose between which of the Robotic Objectives on a Robotic Microscope to use to magnify the Microscopic Object residing on a Slide by moving it into the axis of the light source located on the Robotic Microscope. A person skilled in the art will know that, central processing units commercially available through such companies as Intel and AMD and/or virtual parallel processing software allows Signals Transmitted from each one of the above said VCD's to be processed and acted upon simultaneously in real or near real time by the Robot Control Program (109a) and Computer Interface (108a) to allow a Microscopist to simultaneously move the Slide while maintaining fine focus on the Microscopic Object as if they were Examining the Slide on a Microscope.

One Fourth Embodiment of a VRCS assembling a collection of a plurality of above said VCD's onto a housing: FIG. 5.

Shown in FIG. 5a is a three-dimensional partially exploded view of a plurality of above said VCD's (201a, 202a, two of 305 without base (310), two of 314, and 316) and a housing (501) the base and sides of which may be manufactured from a plurality of Rigid Materials and machined with a plurality openings several shown allowing each of the above said VCD's to be assembled to the housing as shown. The interior space (502) is designed to be large enough and manufactured to allow for the incorporation of a plurality of additional devices including but not limited to a power source (503) shown with power cord that may be passed through opening (507) to provide power to the entire assembly and at least one computer (504) with at least the computing power and software found in prior art Telepathology System computers (101). In this implementation, shown each compound VRCD (305) in partially exploded view with assembly taken off the base (310) and inserted into slot (505) (only one shown for clarity) on each side of housing (501) and Fastened (Fastener not shown for clarity). Each of the three other VRCD's (two of 314 and one of 316) are provided with a small opening in their base (not shown for clarity) to allow them to be attached to the front of the housing (501) with Fasteners (not shown for clarity) through openings (506). The VRSD housing (203) may be placed on top of the housing (501) and Fastened by any number of means including but not limited to snaps and screws.

Shown in FIG. 5b is a three-dimensional assembled view of the first implementation of this embodiment of the invention showing a plurality of VCD's assembled into a single, easy to handle Virtual Control Box (508a) that may be used as a stand alone VRCS or further assembled with other devices and commercially available Microscope parts as needed to create a plurality of assemblies that can replace part or all of a Robotic Microscope (110) such that the VRCS and Robotic Microscope functions may be merged into one unified and integrated Telepathology System. Furthermore, a person skilled in the art will see the computer (504) assembled in VCB (508a) allows for the incorporation of the Computer Interface (108a) and Robot Control Program (109a) into this implementation of a VRCS further enhancing the Telepathology System by eliminating the need for an external computer.

One Fifth Embodiment of the Invention showing a VRCS incorporating the VCB (508a) revealed above in FIG. 5. into a second implementation of an improved Telepathology System: FIG. 6.

Shown in FIG. 6 is a three-dimensional assembled view of a plurality of devices and the above said VCB (508a) organized on a flat surface (103). For the purpose of this implementation of the invention the VCB (508a) is Connected to a prior art Telepathology System computer (101) by a wireless device (205) whereby manipulation of the VSD's assembled to the VCB (508a) results in the Robot Control Program (109a) running on computer (101) Transmitting Signals to and from a plurality of other devices including but not limited to other computers, Networks, and robotic devices; in this implementation a Robotic Microscope (110). The computer (101) is Connected locally to a plurality of other devices including but not limited to a video display device (102), Keyboard (104) and Mouse (105) providing the means for the Microscopist to Examine of a Slide residing on a Robotic Microscope (110) by viewing of a digital image of all or part of a Microscopic Object (111) residing on a Slide, moving Slide on Robotic Stage, changing magnification by switching between Robotic Objectives, and maintaining focus of the Microscopic Object by adjusting the vertical distance between Robotic Stage and Objective all through the manipulation of the VSD's assembled to the VCB (508a).

One Sixth Embodiment of the invention revealing a modification of the VCB (508a) revealed in FIG. 5. above to provide an improved Robotic Microscope base: FIG. 7

Shown in FIG. 7 is a three-dimensional exploded view of a plurality of devices and a second implementation of a VCB (508b) with fifth implementation of a VSD (201e) and third implementation of a VRSD (202c). A person skilled in the art will know about commercially available Microscope light sources (701) with built in focusing and condenser mechanisms and adjustable iris' (702) allowing focusing of a column of light that may be assembled into the inside of VCB (508b) along with other devices (503, 504) revealed in FIG. 5. above thereby allowing the projection of a focused column of light in a fashion comparable Microscopes and Robotic Microscopes. VRSD (202c) is shown with an opening (703) milled to allow light originating from the sub stage light (701) passing through adjustable iris (702) to illuminate VSD (201e) manufactured from a transparent Rigid Material. Alternately, VRSD (202c) may be manufactured from a transparent rigid material eliminating the need for a hole. An optional motorized slide clip assembly (710) attached to two motors (711) may be assembled to VRSD (202c) using commercially available materials and methods to allow for robotic control of VSD (201e) by a Microscopist residing at another location through a Telepathology System. In this implementation each motor (711) is fixed to panels (712) made of a Rigid Material assembled to the housing (203), each motor (711) is assembled to each panel (712), one at the long and one at the short edge of the housing (203) and further attached to projections (713) of motorized slide clip (710) as shown using one of a plurality of commercially available mesh gear mechanisms incorporated into the bottom of each projection (713) (not shown for clarity) to engage each motor (711) providing the means to move the VSD (201e) to a degree necessary to illuminate any part of its surface that contains all or part of a Microscopic Object residing on its surface by Signals Transmitted from another device. Furthermore a plurality of Robotic Objectives (704) may be attached to a second housing (705) and adapter (706) using commercially available methods and materials from but not limited to Olympus, Nikon, Zeiss, and numerous third party sources to allow movement of Robotic Objectives by hand or by motor located in second housing (705). The above said plurality of devices may be assembled together and secured using a back panel (707) manufactured from a Rigid Material and machined with openings (708) (some not shown for clarity) so as to accept Fasteners (709) (some not shown for clarity). The above revealed embodiment of the invention provides the means of using the VRCS to design and manufacture a Virtual Robotic Microscope Base (herein referred to as VRMB) that may be used to create a plurality of fully integrated Virtual Robotic Microscopes that can entirely replace the prior art Telepathology System thereby almost exactly recapitulating what the Microscopist would experience if they were Examining a Slide on a Microscope while allowing for the examination of a Slide residing locally on the Virtual Robotic Microscope or at a distance on another Robotic Microscope, whether provided by prior art Telepathology Systems or manufactured according to the specifications revealed herein below.

One Seventh Embodiment of a VRCS assembling the VCB (508b) revealed in FIG. 7. above into an improved Robotic Microscope with a choice of optical or digital binocular eye pieces: FIG. 8.

Shown in FIG. 8 is a three-dimensional partially assembled view of devices revealed in FIG. 7 above (the motorized slide clip not shown for clarity) creating an improved Virtual Robotic Microscope using the VRMB (801) revealed in FIG. 7. above equipped with one of two modifications of binocular eyepieces—optical (803a) or digital (803b)—assembled to a housing optical—(802a) or digital (802b)—for Transmission of optical images (802a) or digital images (802b) either of which may be assembled to the Robotic Microscope adapter (706) as shown by dotted arrowed line incorporated into housing (705) by connector (804). These two modifications allow two implementations of this embodiment of the invention that provide two implementations of a unique Virtual Robotic Microscope as revealed herein below.

In the first implementation an optically based viewing system is revealed. A person skilled in the art will know that the optical binocular eyepiece housing (802a) may be manufactured according to common commercial methods to provide an assembly of transparent prisms and lenses to direct a light image passing through VRSD (202c), VSD (201e), magnified through one of the Robotic Objectives, through the binocular eye pieces (803a) to the eyes of the Microscopist.

In the second implementation a digitally based viewing system is revealed. A person skilled in the art will know that a digital image may be projected to the Microscopist's eyes substituting optical lenses with small video display devices commonly incorporated into digital cameras and replacing the above said prisms with commercially available devices presently use in digital cameras including but not limited to Charge Couple Devices also known as CCD's that translate the light image passing through the Robotic Objective into digital Signals displaying an image to the Microscopist.

In both implementations, the VSD (201e) is a Slide so that the Virtual Robotic Microscope (801) may be used in a dual role as a Microscope for examining Slides locally and as a part of a larger Telepathology System allowing Slide (201e) to be examined simultaneously by Microscopists residing at another location by the addition of motorized slide clip (710). Furthermore, in the second implementation of this embodiment of the invention another implementation of the VSD such as (201d) may be substituted for VSD (201e) such that, now the Microscopist may Examine a Slide placed on a Robotic Microscope residing at another location as if it were placed on their Virtual Robotic Microscope. This is achieve through the methodologies revealed herein above and enhanced by designing the housing (705) to detect which Robotic Objective (704) is lined up in the plane of the light on the Virtual Robotic Microscope (801) causing the same or similar Robotic Objective to be lined up on the Robotic Microscope residing at another location and assembling the digital ocular housing (802b) to receiving and displaying digital images of a Slide residing on the Robotic Microscope, on the digital binocular eye pieces (803b). This embodiment of the invention exactly recapitulates all functions of both a Microscope and a Robotic Microscope providing a dramatic and unique improvement to prior art by integrating them in one highly configurable and flexible system.

One Eighth Implementation of a VRCS assembling the above modified VCB (508a) into a Virtual Robotic Microscope with video display device (102): FIG. 9.

Shown in FIG. 9 is a three-dimensional assembled view of the VRMB (801) revealed in FIG. 7. above creating a Virtual Robotic Microscope with video display device (102)

Connected directly to the housing (705) using an adapter (901) such that the existing commercially available devices revealed in FIG. 8. above may be incorporated to translate the light image passing through the Robotic Objectives into digital Signals in the housing (705) and made visible to a plurality of Microscopists on a video display device (102). Furthermore, the incorporation of a computer (504) allows the Connection of a Keyboard (103) and Mouse (104) such that the Microscopist may carry out additional tasks related to Examining a Slide locally or residing on a Robotic Microscope residing at another location including but not limited to viewing and manipulating patient information, generating and disseminating diagnostic reports, contacting and consulting with other Microscopists residing at another location in real time, and storing the results of consulting in an associated electronically stored database along with still and video images of a Microscopic Object residing on a Slide with written or drawn annotations and appended sound files. This embodiment adds significant advantages over prior art Telepathology Systems.

One Ninth embodiment of a VRCS as part of a larger Telepathology System FIG. 10.

Shown in FIG. 10. is a schematic drawing of a plurality of above said VRCS labeled by above assigned part number configured in a plurality of ways as described herein above to create or communicate with a plurality of Robotic Microscopes and a plurality of computers (101) and a plurality of Networks (1001) such that any of a plurality of Microscopists may Examine a plurality of Slides residing at another location by manipulating VCD's assembled to their VCB (508a) or Virtual Robotic Microscope (801).

SUMMARY, RAMIFICATIONS, AND SCOPE

In summary, the various embodiments of the present invention revealed herein above provide a new and unique structure and methodology of designing and manufacturing devices that allow for the creation of a highly flexible, configurable, and easy to use Telepathology Systems to both solve the problems posed by all prior art and further enhance the capabilities and usefulness of Telepathology in general.

There are many very important ramifications of the present invention. A non-inclusive review is presented herein below to further clarify its many benefits.

A first ramification of the present invention involves the manufacture of a configurable Virtual Slide Device that allows a Microscopist to move a Slide residing on a Robotic Microscope Stage residing at another location as if they were moving it locally on a Microscope solving the problems associated with the unnatural Computer Interface required by prior art.

A further ramification of the present invention relates to how the Virtual Slide Device allows the option to project an image of the Slide residing on the Robotic Microscope on its surface providing the Microscopist with a visual means of coordinating the movement of the Virtual Slide Device to enhance the ability to control Slide on the Robotic Microscope as if it were being manipulated directly by Microscopist not provided by prior art.

A further ramification of the present invention relates to how the Virtual Slide Device to project additional information about the Slide helping the Microscopist to keep track of which Slide they are Examining just as they would if using a Microscope not provided by prior art.

A further ramification of the present invention relates to how the above said Rotating Control Devices allows for a Microscopist to control course and fine focus on Robotic Microscope while simultaneously using the Virtual Slide Device allowing a Microscopist to control course and fine focus while moving the Slide on Robotic Microscope exactly as they would if Examining Slide on a Microscope not provided by prior art.

A further ramification of the present invention relates to how the above said Virtual Robotic Control System provides the means of manufacturing a Virtual Robotic Microscope Base that may be used as a free standing device for controlling Robotic Microscopes either directly or via a Computer Interface greatly improving the flexibility and configurability over prior art Telepathology Systems.

A further ramification of the present invention relates to how the above said Virtual Robotic Control System provides the means of manufacturing a complete Virtual Microscope that may be configured to incorporate a plurality of digital and/or analog features creating a device that may act both as a Microscope, as a Virtual Robotic Microscope, and as a means of controlling another Robotic Microscope dramatically improving the flexibility and configurability over prior art Telepathology Systems.

OTHER EMBODIMENTS OF THE INVENTION

The above revealed embodiments and implementations are not meant to limit the scope of the present invention. A person skilled in the art will see that many other unspecified capabilities may be accessed through modifications of the VRCS. A first nonexclusive example would be that the above embodiments of the invention provide a means for rapidly swapping between the video display device (202) and either of the two binocular eyepiece housings (802a, 802b) to meet any particular need of the Microscopist. Another nonexclusive example would be a binocular housing designed and manufactured that includes an additional adapter so that both a video display device and binocular eye piece may be attached simultaneously allowing the Microscopist to Examine a Slide using either display while providing a means of interacting with the computer interface (109a) for purposes related to Telepathology and purposes related to other tasks.

What is claimed is:

1. A First Virtual Slide Device comprising:
   at least one first panel with a size and shape comparable to a glass slide such that the at least one first panel is configured to be movable across a surface as at least one first microscopist would move a glass slide across a microscope stage;
   at least one first slot manufactured into said at least one first panel;
   at least one second slot manufacture into said at least one first panel such that each said at least one first and said at least one second slot are located at opposite corners of said at least one first panel;
   at least one second panel of same size and shape with at least one third and at least one fourth slot manufacture into said at least one second panel such that each said at least one third and said at least one fourth slot are located at opposite corners in mirror image to said at least one first and said at least one second slots whereby when said at least one first panel is placed over said at least one second panel said at least one first slot and said at least one third slot line up and said at least one second and said at least one fourth slot line up;
   at least one first electromagnetic device enclosed by said at least one first and said at least one third slot;
   at least one second electromagnetic device enclosed by said at least one second and said at least one fourth slot;
   at least one fifth slot manufactured into said at least one first panel;
   at least one sixth slot manufactured into said at least one second panel; and
   at least one first power source enclosed by said at least one fifth and said at least one sixth slot whereby, when connected to said at least one first and said at least one second electromagnetic devices causes signals to be generated that are detectable by at least one other device.

2. The First Virtual Slide Device as recited in claim 1, further comprising:
   at least one second panel attached to at least one surface of said at least one first virtual slide device to facilitate movement of said at least one virtual slide device across a surface by a said at least one first microscopist using said at least one second panel.

3. The First Virtual Slide Device as recited in claim 1, further comprising:
   at least one first depression made in at least one surface of said at least one first virtual slide device to facilitate movement of said at least one first panel across a surface by placement of a finger or other object in said at least one first depression.

4. The First Virtual Slide Device as recited in claim 1, further comprising:
   at least one first video display device assembled to at least one surface of said at least one first virtual slide device whereby images and symbolic data are receivable from at least one other device and displayed such that at least one first image of a microscopic object residing on at least one first slide residing on at least one first robotic microscope is visible and that at least one first alphanumeric symbol representing identification of said at least one first slide is visible.

5. The First Virtual Slide Device as recited in claim 1, further comprising:
   at least one first glass slide.

* * * * *